(12) United States Patent
Dahl et al.

(10) Patent No.: US 9,096,692 B2
(45) Date of Patent: Aug. 4, 2015

(54) METHOD TO PRODUCE MICROCELLULOSE

(75) Inventors: Olli Dahl, Tervakoski (FI); Kari Vanhatalo, Helsinki (FI); Kari Parviainen, Espoo (FI); Mikael Svedman, Vaasa (FI)

(73) Assignee: AALTO UNIVERSITY FOUNDATION, Suomi (FI)

( * ) Notice: Subject to any disclaimer, the term of this patent is extended or adjusted under 35 U.S.C. 154(b) by 0 days.

(21) Appl. No.: 13/697,713

(22) PCT Filed: Jun. 7, 2011

(86) PCT No.: PCT/FI2011/050527
§ 371 (c)(1),
(2), (4) Date: Jan. 24, 2013

(87) PCT Pub. No.: WO2011/154601
PCT Pub. Date: Dec. 15, 2011

(65) Prior Publication Data
US 2013/0199518 A1    Aug. 8, 2013

(30) Foreign Application Priority Data
Jun. 7, 2010 (FI) .................................. 20105641

(51) Int. Cl.
C08B 15/00    (2006.01)
C08B 15/02    (2006.01)

(52) U.S. Cl.
CPC ............... *C08B 15/00* (2013.01); *C08B 15/02* (2013.01)

(58) Field of Classification Search
None
See application file for complete search history.

(56) References Cited

U.S. PATENT DOCUMENTS

| 3,954,727 | A  |   | 5/1976  | Toshkov et al. |
|-----------|----|---|---------|----------------|
| 4,126,706 | A  | * | 11/1978 | Hilton ........................... 426/438 |
| 6,057,438 | A  | * | 5/2000  | Hyatt et al. ................... 536/127 |
| 6,228,213 | B1 | * | 5/2001  | Hanna et al. .................... 162/18 |
| 6,508,583 | B1 | * | 1/2003  | Shankwitz et al. ........... 366/196 |
| 2004/0226671 | A1 | * | 11/2004 | Nguyen et al. ................. 162/25 |
| 2006/0144535 | A1 | * | 7/2006  | Nguyen et al. ............... 162/103 |
| 2006/0219376 | A1 | * | 10/2006 | Luo ................................ 162/87 |

FOREIGN PATENT DOCUMENTS

WO    9915564 A1    4/1999
WO    2010131088 A1    11/2010

OTHER PUBLICATIONS

"Chlorite & Kraft reactivity" BioResources vol. 6, issue (3), pp. 2581-2591 May 2011 Javed & Germgard.*
"Comparative study of cellulose fragmentation by enzymes and ultrasound" F.M. Gama et al. Enzyme and Microbial Technology, vol. 20 pp. 12-17; 1997.*
"The effect of ultrasound on the particle size and structural disorder of a well-ordered kaolinite" F. Franco et al. Journal of Colloid and Interface Science, vol. 274, pp. 107-117, 2004.*
Rydholm, "Pulping Process," Interscience Publishers, 1965, pp. 649-672.
International Search Report and Written Opinion dated Nov. 28, 2011.
International Preliminary Report on Patentability dated Aug. 22, 2012.
Finland Search Report dated Mar. 24, 2011.

* cited by examiner

*Primary Examiner* — Melvin C Mayes
*Assistant Examiner* — Douglas Call
(74) *Attorney, Agent, or Firm* — Thomas Horstemeyer, LLP

(57) ABSTRACT

The present invention relates to a process for producing microcellulose comprising subjecting fibrous cellulosic material to acid hydrolysis at a temperature of at least 40° C. and at a consistency of at least 8% on dry weight of the cellulose, wherein the amount of added acid is from 0.2 to 2%, preferably from 0.5 to 1.5% on dry weight of the cellulose.

19 Claims, 2 Drawing Sheets

METHOD TO PRODUCE MICROCELLULOSE

CROSS REFERENCE TO RELATED APPLICATION

This application is the 35 U.S.C. §371 national stage of PCT application entitled "A Novel Method to Produce Microcellulose," having serial number PCT/FI2011/050527, filed on 7 Jun. 2011, which claims priority to Finland Application No. 20105641, filing date Jun. 7, 2010, which is incorporated by reference in its entirety.

FIELD OF THE INVENTION

The present invention relates to an improved process for preparing microcellulose by weak acid hydrolysis of fibrous cellulosic material.

BACKGROUND OF THE INVENTION

Microcellulose (also named as e.g. level-off DP cellulose and micro crystalline cellulose) is a versatile product in many industrial applications, e.g. in food, pharmaceutical, cosmetics, paper and board and many other applications. Microcellulose can also be used in the production of derivatives of microcellulose, such as viscose cellulose, CMC, nanocellulose and various composite products.

Several methods have been proposed in the patent literature for producing microcellulose.

U.S. Pat. No. 2,978,446 describes the production of level-off DP (degree of polymerization) cellulose by acid hydrolysis and mechanical treatment. Cellulose is hydrolyzed with boiling in 2.5 normal hydrochloric acid (HCl). Acid concentration is thus 9% and temperature about 105° C. The consistency of the pulp and the amount of added acid are not specified. The hydrolyzed cellulose requires mechanical disintegration in aqueous medium.

U.S. Pat. No. 3,278,519 describes a similar method for producing level-off DP cellulose by hydrolyzing cellulose either with 2.5 normal HCl at 105° C. or with 0.5% HCl at 250° F. (121° C.). The consistency of the pulp and the amount of added acid are not specified.

U.S. Pat. No. 3,954,727 discloses a method for producing microcrystalline cellulose by hydrolyzing cellulose with dilute sulphuric acid at a temperature of from 120 to 160° C. The dilute sulphuric acid to which the cellulose is added has a concentration of 1% and the cellulose-acid mass has a concentration of 5%. Thus, the consistency of the pulp is low and the amount of acid based on the dry weight of the cellulose is high.

U.S. Pat. No. 7,037,405 describes a method, in which raw pulp material is contacted with acid and heated at elevated temperature and then treated mechanically. A suitable acid concentration is mentioned to be 1-5% of the mixture, a suitable pulp consistency 3-50%, a suitable temperature range 80-120° C. and a suitable reaction time 30 min-4 h. After acid hydrolysis the pulp mixture is treated mechanically for disintegration of the fibres. Preferably the mechanical disintegration process step shears the crystalline cellulose particles into micron size ranging form about 1 to 10 micron size. The process of U.S. Pat. No. 7,037,405 suffers of complicated production process. Mechanical disintegration step is required after acid hydrolysis. This stage requires in production costly refiner unit and refining energy of 5-100 kWh/ton.

U.S. Pat. No. 6,228,213 discloses a process for producing microcrystalline cellulose by adding an acid solution to cellulose and feeding the cellulose and acid solution through an extruder, wherein the cellulose undergoes acid hydrolysis and forms microcrystalline cellulose. The temperature of the extruder barrel during the hydrolysis is from 80 to 200° C. Due to the temperature of the extruder and the pressure created by the die or screw of the extruder, the cellulose melts in the extruder, which allows for more intimate contact between the cellulose and the acid. The compression ratio of the extruder screw is between 1.5:1 and 3:1, preferably about 3:1. Disadvantages with extruders are that they are expensive, the maintenance costs are rather high, and they require a high mechanical energy input, by estimation at least 100 kWh, typically at least 150 kWh per dry ton cellulose (the heating energy input is excluded).

U.S. Pat. No. 5,543,511 describes the production of level-off-DP cellulose using partial hydrolysis with oxygen and/or carbon dioxide at 100-200° C.

U.S. Pat. No. 4,427,778 describes the production of level-off-DP cellulose by enzymatic hydrolysis.

Acid hydrolysis is also used in the dissolving pulp production, e.g. in acidic bisulphite cooking and as a pre-hydrolysis step in the kraft process. Acidic Bisulphite cooking is described in e.g. Rydholm, S. E., Pulping Processes, pp. 649 to 672. U.S. Pat. No. 5,589,033 describes a pre-hydrolysis kraft process of lignin-containing cellulosic material (i.e. wood chips) at 100-160° C. for softwoods and at 120-180° C. for hardwoods for 10-200 min. Neutralization and alkaline kraft cooking follows the pre-hydrolysis step. The final product is a pulp with high alpha cellulose purity and can be used as dissolving pulp. Dissolving pulp has a fibrous structure with fiber length of typically 0.5 mm to 2.5 mm dependent on wood raw material. Thus, the physical dimensions are much larger than microcellulose.

In view of the above described processes for producing microcellulose there is a need for an even more efficient and economical process for producing microcellulose.

SUMMARY OF THE INVENTION

According to the present invention it was surprisingly found that a high quality microcellulose with narrow particle size distribution can be produced from fibrous cellulosic material by mild acid hydrolysis at a high consistency of at least 8% and high temperature of at least 140° C. The particle size distribution can be easily controlled by varying the conditions of the mild acid hydrolysis.

DETAILED DESCRIPTION OF THE INVENTION

Figure 1:
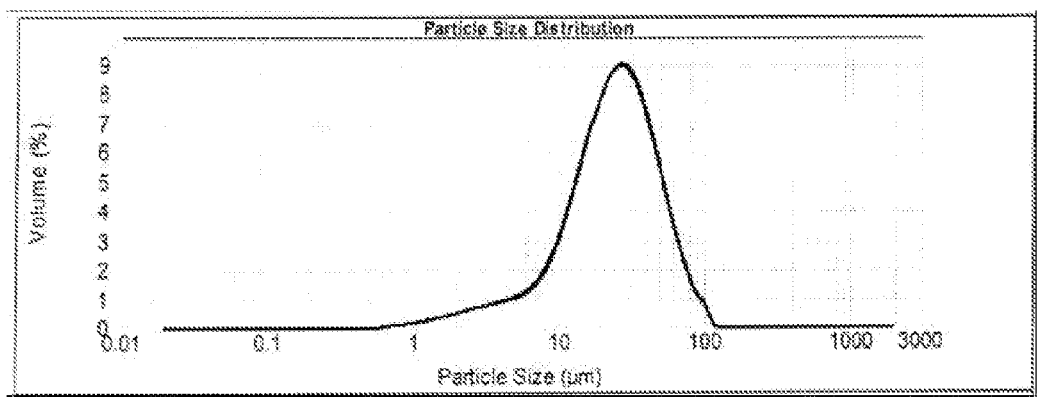
FIG. 1 shows the particle size distribution curve of microcellulose produced according to the present invention at 160° C. and acid dose of 0.5%.

According to the present invention there is provided a process for producing microcellulose comprising subjecting fibrous cellulosic material to acid hydrolysis at a temperature of at least 140° C. and at a consistency of at least 8% on dry weight of the cellulose, wherein the amount of added acid is from 0.2 to 2%, preferably from 0.5 to 1.5% on dry weight of the cellulose.

As used in this specification the term "microcellulose" includes microcrystalline cellulose MCC but refers also to similar products which are not totally crystalline but may contain some amorphous regions. The microcellulose of the present invention typically has a hemicellulose content of about 0 to 10%, preferably 0.5 to 7%, more preferably 1 to 5% by weight measured by typical carbohydrate analysis methods (Determination of hemicelluloses and pectins in wood and pulp fibres by acid methanolysis and gas chromatography. 1996. Nordic pulp and paper research journal nro 4, 1996. p. 216-219).

Suitable acids for the hydrolysis are both organic and inorganic acids. The organic acid may be e.g. formic acid or acetic acid. Preferred acids are mineral acids, such as sulphuric acid, hydrochloric acid, nitric acid, sodium bisulphate or sodium bisulphite. Also mixtures of two or more of these acids may be used. A preferred mineral acid is sulphuric acid.

Preferably the hydrolysis is carried in a reactor without essential compression, the compression ratio of the reactor preferably being below 1.5:1, more preferably below 1.2:1.

The hydrolysis temperature is preferably between 140 and 185° C., more preferably between 150 and 180° C., and most preferably between 155 and 175° C.

The consistency of the cellulosis material during the hydrolysis is preferably from 8 to 50%, more preferably from 15 to 50%, even more preferably from 20 to 50%, and most preferably from 25 to 45% on dry weight of the cellulose.

The hydrolysis time is preferably from 5 to 180 minutes, more preferably from 15 to 150 minutes.

Preferably the mechanical energy input during the hydrolysis is provided to ensure even chemical and temperature distribution and without essential mechanical cutting and mechanical defibration of the cellulose matrix, preferably at most 20 kWh per dry ton cellulose, more preferably at most 10 kWh per dry ton cellulose, and most preferably between 1 and 5 kWh per dry ton cellulose.

According to the invention the fibrous cellulosic material and the acid are contacted with each other, preferably by mixing.

After the hydrolysis the obtained microcellulose-hydrolysate mixture may, if necessary, be neutralized or the microcellulose may be separated from the hydrolysate. The separated microcellulose may be washed and the separated or washed microcellulose may be neutralized. Also the acid hydrolysate may be neutralized. E.g. sodium carbonate, sodium bicarbonate, potassium hydroxide, magnesium hydroxide or sodium hydroxide may be used for the neutralization. The hydrolysate is rich in hemicellulose hydrolysis products, such as xylose and glucose, and can be used for the production of ethanol.

It has been observed that microcellulose material with an average particle size of about 8-100 µm, preferably 10-60 µm, more preferably 15-30 µm—as determined by the procedure described later on in this specification—can be produced from fibrous cellulosic material by mild acid hydrolysis at a consistency of at least 8% and at a temperature of at least 140° C. without a subsequent disintegration step. An essential feature of the present invention is the high consistency of the cellulosic material, which preferably is at least 20% on dry weight of the cellulose. The high consistency increases the concentration of the chemicals which has a favourable effect on the reaction speed. In addition, the heating demand will be lower.

The fibrous cellulosic material used as a starting material in the process of the present invention may be any cellulosic material that can be hydrolyzed under the specified conditions. The fibrous cellulosic material does not necessarily have to be a pure cellulosic material but it can also contain other materials such as lignin.

The lignin content of the fibrous cellulosic starting material is preferably at most 5%, more preferably at most 2%, most preferably at most 1%.

The fibrous cellulosic starting material typically has a hemicellulose content of about 3 to 15%, preferably 5 to 10% by weight measured by typical carbohydrate analysis methods (Determination of hemicelluloses and pectins in wood and pulp fibres by acid methanolysis and gas chromatography. 1996. Nordic pulp and paper research journal nro 4, 1996. p. 216-219).

The fibre length of the fibrous cellulosic raw material is preferably 5-0.2 mm. For non-wood fibrous cellulosic materials, such as cotton the fibre length may be more than 5 mm.

The fibrous cellulosic material may be derived from wood plant material, such as softwoods or hardwoods.

A preferred fibrous cellulosic material is a bleached or unbleached chemical pulp, such as kraft pulp, soda-AQ pulp, sulfite pulp, neutral sulfite pulp, acid sulfite pulp or an organosolv pulp. The pulp may be softwood or hardwood pulp. The pulp may be a pulp obtained immediately after the digestion or a pulp that has been delignified after the digestion or a pulp that has been delignified and bleached. A preferred delignified pulp is an $O_2$ delignified pulp. A preferred pulp is fully bleached pulp.

According to the present invention it is also possible to use fibrous cellulosic material obtained from non-wood lignocellulosic plant materials such as cotton, grass, bagasse, straws of grain crops, flax, hemp, sisal, abaca or bamboo. Usually these plant materials are treated with an alkaline substance to break the lignocellulosic material into cellulose, lignin and hemicellulose followed by separating the cellulose from the mixture. Some lignin-poor plant materials, such as cotton linters or cotton textiles do not necessarily require a treatment with an alkaline substance. The latter materials may contain more than 90% cotton fibres of the fibrous material The fibrous cellulosic material, such as chemical pulp preferably has a lignin content of below 40 kappa number, more preferably below 30 kappa number, and most preferably below 10 kappa number.

According to a preferred embodiment of the invention the produced microcellulose has a narrow particle size distribution, wherein the average particle size (D50) is 10-60 µm, more preferably 15-30 µm, and preferably the particle size distribution (D90) is such that at least 90% by volume of the particles have a size of below 100 µm. The particle size was determined by the procedure described later on in this specification which procedure includes ultrasonic treatment which might cause deagglomerization or disintegration of the sample.

The microcellulose material obtained by the process of the invention typically has an average particle size between 8-100 µm, preferably between 10-60 µm and more preferably between 15-30 µm—as determined by the procedure described later on in this specification—without any mechanical treatment. It is possible to refine the structure if finer particle size is required. Thus, the microcellulose material obtained from the hydrolysis may, if desired, be refined to a smaller particle size by using suitable devices, such as friction grinders wherein the refining is effected by grinding stones (e.g. Masuko grinder), high shear mixers or jet mills.

A benefit of the process of the invention is that the purity of the final microcellulose is moderately high and that the product can be easily washed to remove low molecular weight carbohydrates. The cellulose purity of washed microcellulose can be even over 97%.

The yield of the microcellulose depends on the conditions of the hydrolysis, such as temperature, amount of acid and hydrolysis time as well as consistency. A typical yield is at least 80%, preferably at least 85% and the yield may even be 90% or higher.

According to the present invention the microcellulose may be produced in any suitable equipment wherein the cellulose-acid mixture is not subjected to any substantial compression, such as a vessel equipped with a mixer or screw conveyor. The latter one may be a device of the continuous vertical or semi-vertical, e.g. M&D digesters, vertical screw digester/reactor type having a screw conveyor. The compression ratio, if any, is typically below 1.5:1, more preferably below 1.2:1. Other devices may be continuous bleaching towers or down-flow continuous digesters, e.g. of type Kamyr.

EXPERIMENTAL SECTION

The following examples to produce microcellulose describe the procedure according to invention. The cooking experiments were done with an air-bath-digester, manufactured by Haato Oy. The air-bath-digester consists of six separate autoclave units, which all have a volume of 2.5 liter. The units are heated with hot air. Air is heated with an electric resistor and the heated air is circulated with a fan.

All of the cooking experiments were done in the following manner. The cellulose material, pulp or other, was put in an autoclave unit. Pulp in bale sheets was cut in square pieces with edge of about 1-2 cm prior to loading to autoclave unit. Fresh cellulose material, e.g. unbleached pulp, was dried to consistency of 45-50% and then homogenized with Kenwood household mixer for 5 min, prior to loading into autoclave unit. Acid solution was dosed after cellulose material. Acid was first premixed with de-ionized water and the aqueous acid solution was poured evenly on the pulp. The lid of the autoclave unit was closed and the unit was heated to 80° C. The pre-heating stage took about 20 min in each test. When 80° C. start temperature had been reached, the real heating stage started. The autoclave unit was heated in a controlled manner with heating speed of 2° C./min until the cooking temperature target had been reached. Thus heating e.g. to 160° C. took 40 min and to 175° C. took 47.5 min. Cooking time started, when the target cooking temperature had been reached. Temperature was kept at the target temperature value during the whole cooking time. When cooking time was completed, the autoclave unit was immediately removed and cooled with cold water (temperature about 10° C.).

Cooled autoclave unit was opened and the cellulose mixture was put into a filter bag (mesh 90). The excess acid solution in the mixture was removed with a spin dryer (Manufacturer UPO. Drying time 2 min, speed about 2800 rpm). Consistency after spin dryer treatment was 45-50%. The cellulose material was then washed with 3 liter of de-ionized water, by first mixing the mixture gently for 5 min and drying the mixture with spin dryer to consistency of 45-50%. The washing step with de-ionized water was repeated two times. pH in the last (third) aqueous mixture was about 6-7 and washing was considered to be complete.

The washed cellulose material was weighed. Three samples, each about 20 g were taken, combined and weighted. The combined samples were dried in an oven (105° C., 24 h). Using the moisture value of the sample the total amount of dry (absolute) cellulose material was calculated. Process yield was calculated using the amount of dry cellulose material of the washed product and the dry cellulose material in the start.

Particle sizes of the cellulose products were determined by laser diffraction with Mastersizer 2000 (made by Malvern Instruments Ltd) equipped with a wet dispersion unit Hydro 2000MU. The determinations were done according to the following procedure:

A sample of the cellulosic material was dispersed in 500 ml of distilled water. The sample concentration was adjusted in a manner that the obscuration was 10%. Pump/stir rate of the dispersion unit was adjusted to 1500 rpm. The sample was treated with ultrasonic for 60 sec prior to the particle size measurement. Particle sizes were measured in 3 sequential measurements in 60 sec intervals. The average value of three measurements was calculated. Background was measured each time prior to the sample. The measuring time for each background and each sample measurements was 5 sec. The measurements were done using Fraunhofer parameters. More data for laser diffraction measurement principles are presented in Master sizer 2000 application note MRK 561 (Wet method development for laser diffraction measurements) by Malvern Instruments and ISO-13320-1 (1:1999), Particle size analysis—Laser diffraction General Principles.

Example 1

Acid Hydrolysis of Fully Bleached Pulp, Acid Dosage 0.5% (of Dry Pulp), Cooking Temperature 160° C.

A series of hydrolysis experiments was done with fully bleached softwood pulp. The pulp was in bale sheets (dry substances 92.4%). The procedure of the experiment 1-1 is described below. All of the experiments were done in the similar manner.

Pulp pieces 324.7 g (bale sheets, dry substances 92.4%, dry pulp 300 g) were put into an autoclave unit of an air-bath-digester. Sulphuric acid 15.3 ml (conc. 1 mole/liter, absolute sulphuric acid amount 1.50 g) and water 660 ml was premixed and added on the pulp pieces. Consistency of the mixture was 30%. Sulphuric acid dosage of the pulp (absolute acid of dry pulp) was 0.5%.

The autoclave unit was closed and heating was started. The digester was first heated up to 80° C. in 20 min and then heating stage was started. The mixture was heated with a speed of 2° C./min to 160° C. When temperature has reached 160° C., the cooking time was started. After 30 min cooking, the autoclave unit was removed immediately and cooled in a water bath. Temperature of the water bath was 10° C. The reaction product was transferred from the autoclave unit into a filter-bag (mesh 90) and dried with a spin dryer (Manufacturer UPO. Drying time 2 min, speed about 2800 rpm) and washed according to above-mentioned washing procedure. The amount of washed material was 573.3 g. Consistency of the material was 47.2%. The amount of dry material was 270.6 g and process yield thus 90.2%. The parameters and the results of example 1 are presented in table 1.

TABLE 1

| Exp. | Sulphuric acid dosage (%) | Cooking time (min) | Reaction temperature (° C.) | Consistency (%) | Yield (%) | Average particle size (μm) |
|---|---|---|---|---|---|---|
| 1-1 | 0.5 | 30 | 160 | 30 | 90 | 24 |
| 1-2 | 0.5 | 90 | 160 | 30 | 87 | 21 |
| 1-3 | 0.5 | 150 | 160 | 30 | 83 | 18 |

Particle size distribution was determined with Malvern Mastersizer 2000, using the dispersion unit Hydro 2000 MU. The particle size distribution curve of experiment 1-1 is presented in FIG. 1.

The results of the experiments in example 1 show that hydrolysis with low acid concentration at 160° C. yields good quality homogenous microcellulose with average particle size about 20 μm without any mechanical treatment. The yield is good with cooking time of 90 min or below and starts to decrease slightly with cooking time above 90 min.

Example 2

Acid Hydrolysis of Fully Bleached Pulp, Acid Dosage 1.5%, Cooking Temperature of 160° C.

A series of hydrolysis experiments was done with fully bleached softwood pulp, moisture 10%. The parameters and the results of example 2 are presented in table 2.

TABLE 2

| Exp. | Sulphuric acid dosage (%) | Cooking time (min) | Reaction temperature (° C.) | Consistency (%) | Yield (%) | Average particle size (μm) |
|---|---|---|---|---|---|---|
| 2-1 | 1.5 | 30 | 160 | 30 | 85 | 18 |
| 2-2 | 1.5 | 90 | 160 | 30 | 82 | 19 |
| 2-3 | 1.5 | 150 | 160 | 30 | 78 | 16 |

Particle size distribution curves were similar to those of example 1. The results show that microcellulose with average particle size below 20 μm can be produced without the need of mechanical treatment. The results show that with increased cooking time particle size decreases slightly but yield significantly. Compared to example 1, the average particle sizes are lower, but yields are also lower.

Example 3

Acid Hydrolysis of Fully Bleached Pulp, Acid Dosage 0.5%, Cooking Temperature 175° C.

Figure 2:
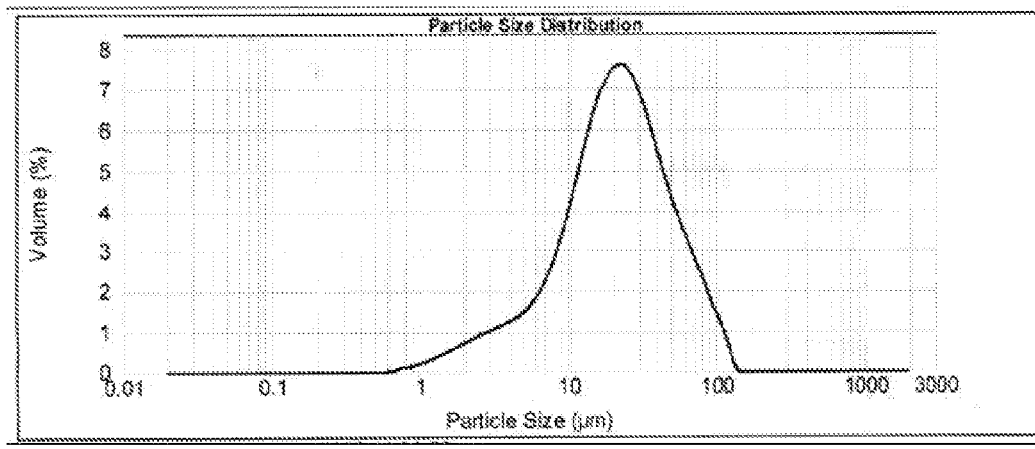
FIG. 2 shows the particle size distribution curve of microcellulose produced according to the present invention at 175° C. and acid dose of 0.5%.

A series of hydrolysis experiments was done with fully bleached softwood pulp, moisture 10%. The parameters and the results of example 3 are presented in table 3. Particle size distribution curve of Experiment 3-1 is presented in FIG. 2.

TABLE 3

| Exp. | Sulphuric acid dosage (%) | Cooking time (min) | Temperature (° C.) | Consistency (%) | Yield (%) | Average particle size (μm) |
|---|---|---|---|---|---|---|
| 3-1 | 0.5 | 15 | 175 | 30 | 86 | 21 |
| 3-2 | 0.5 | 30 | 175 | 30 | 86 | 20 |
| 3-3 | 0.5 | 90 | 175 | 30 | 76 | 18 |

The results in table 3 show that microcellulose with average particle size of approximately 20 μm can be produced with good yield with cooking time of 30 min or less. Decreased process yield was observed with cooking time of 90 min.

Example 4

Acid Hydrolysis of Fully Bleached Pulp, Acid Dosage 1.5%, Cooking Temperature 175° C.

A series of hydrolysis experiments was done with fully bleached softwood pulp, moisture 10%. The parameters and the results of example 4 are presented in table 4.

TABLE 4

| Exp. | Sulphuric acid dosage (%) | Cooking time (min) | Temperature (° C.) | Consistency (%) | Yield (%) | Average particle size (μm) |
|---|---|---|---|---|---|---|
| 4-1 | 1.5 | 15 | 175 | 30 | 80 | 19 |
| 4-2 | 1.5 | 30 | 175 | 30 | 77 | 19 |
| 4-3 | 1.5 | 90 | 175 | 30 | 71 | 17 |

The results show that good quality microcellulose with particle size below 20 μm can be produced in cooking time of 15 min. The process yield starts to decrease in a function of reaction time. Short reaction times are beneficial at high cooking temperatures.

Example 5

Acid Hydrolysis of Fully Bleached Pulp, Cooking Time 90 Min, Cooking Temperature 140° C.

Figure 3:
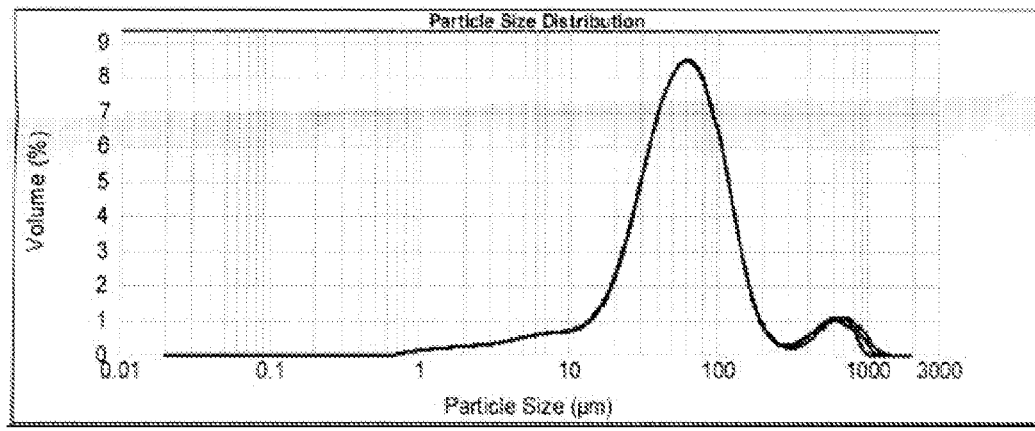
FIG. 3 shows the particle size distribution curve of microcellulose produced according to the present invention at 140° C. and acid dose of 0.5%.
Figure 4:
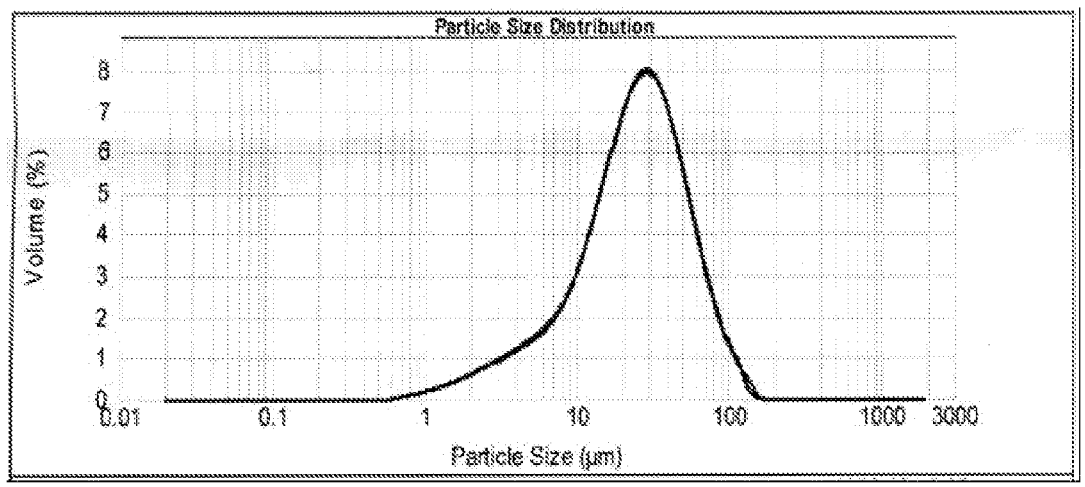
FIG. 4 shows the particle size distribution curve of microcellulose produced according to the present invention at 140° C. and acid dose of 1.5%.

A couple of hydrolysis experiments were done with fully bleached softwood pulp (moisture 10%). The parameters and the results of example 5 are presented in table 5. Particle size distribution curve of Experiment 5-1 is presented in FIG. 3 and curve of Experiment 5-2 is presented in the FIG. 4.

TABLE 5

| Exp. | Sulphuric acid dosage (%) | Cooking time (min) | Temperature (° C.) | Consistency (%) | Yield (%) | Average particle size (μm) |
|---|---|---|---|---|---|---|
| 5-1 | 0.5 | 90 | 140 | 30 | 92 | 50 |
| 5-2 | 1.5 | 90 | 140 | 30 | 89 | 30 |

The results show that at temperature of 140° C. sulphuric acid concentration of 1.5% is enough for good quality microcellulose with good process yield. Process yield is good with acid concentration of 0.5%, but particle size distribution curve of Exp 5-1 shows that there is a population of particles, with diameter above 100 μm present in the product.

Example 6

Acid Hydrolysis of Unbleached Pine Pulp, Acid Dosage 0.5%, Temperature 160° C.

A series of hydrolysis experiments were done with softwood pulp after cooking stage. The parameters and the results of example 6 are presented in table 6.

TABLE 6

| Exp. | Sulphuric acid dosage (%) | Cooking time (min) | Temperature (° C.) | Consistency (%) | Yield (%) | Average particle size (μm) |
|---|---|---|---|---|---|---|
| 6-1 | 0.5 | 30 | 160 | 30 | 93 | 40 |
| 6-2 | 0.5 | 90 | 160 | 30 | 89 | 32 |
| 6-3 | 0.5 | 150 | 160 | 30 | 83 | 21 |

The results show that high quality microcellulose can be produced using fresh softwood pulp as a raw material. Process yield is good in the Experiments 6-1 and 6-2 and moderate in the Experiment 6-3. The average particle size is the lowest in Experiment 6-3.

Example 7

Acid Hydrolysis of Unbleached Softwood Pulp, Acid Dosage 1.5%, Cooking Time 30 Min A couple of hydrolysis experiments were done with unbleached softwood pulp. The parameters and the results of example 7 are presented in table 7.

TABLE 7

| Exp. | Sulphuric acid dosage (%) | Cooking time (min) | Temperature (° C.) | Consistency (%) | Yield (%) |
|---|---|---|---|---|---|
| 7-1 | 1.5 | 30 | 160 | 30 | 91 |
| 7-2 | 1.5 | 30 | 175 | 30 | 85 |

The results show that unbleached softwood pulp is suitable raw material for the production of microcellulose. Cooking time of 30 min is sufficient.

Example 8

Comparative Example. Acid Hydrolysis of Fully Bleached Pulp, Temperature 120° C.

Figure 5:
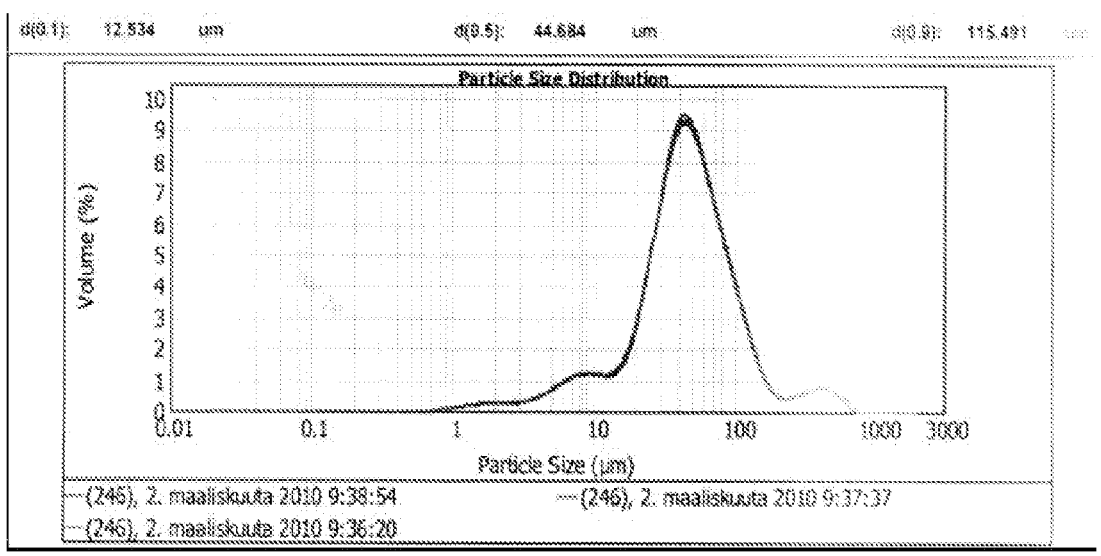
FIG. 5 shows the particle size distribution curve of microcellulose produced at 120° C. and acid dose of 1.5% which does not represent the present invention.

A series of hydrolysis experiments was done with fully bleached softwood pulp (moisture 10%). The parameters and the results of the comparative example 8 are presented in table 8. Particle size distribution of the experiment 8-5 is in FIG. 5.

TABLE 8

| Exp. | Sulphuric acid dosage (%) | Cooking time (min) | Temperature (° C.) | Consistency (%) | Yield (%) | Average particle size (μm) | Particle size, 90% (μm) |
|---|---|---|---|---|---|---|---|
| 8-1 | 1.5 | 150 | 120 | 20 | 97 | 56 | 164 |
| 8-2 | 2.0 | 150 | 120 | 20 | 97 | 49 | 134 |
| 8-3 | 1.5 | 90 | 120 | 30 | 97 | 55 | 154 |
| 8-4 | 2.0 | 90 | 120 | 30 | 97 | 44 | 112 |
| 8-5 | 1.5 | 150 | 120 | 30 | 96 | 45 | 115 |
| 8-6 | 2.0 | 150 | 120 | 30 | 91 | 41 | 102 |

The results show that when pulp is cooked at 120° C. even for long times, the quality of microcellulose is not very good. Over 10% of the particles have particle size over 100 μm and thus refining is necessary to get sufficient material for microcellulose applications.

The invention claimed is:

1. A process for producing microcellulose comprising subjecting fibrous cellulosic material comprising bleached pulp suspension made from softwoods or hardwoods to acid hydrolysis at a temperature of at least 140° C. and at a consistency of at least 8% on dry weight of the cellulose, wherein the amount of added acid is from 0.5 to 1.5% on dry weight of the cellulose, and wherein the hydrolysis is carried in a continuous bleaching tower, and wherein the produced microcellulose having an average particle size of 8-100 μm is obtained without a subsequent mechanical treatment step.

2. The process according to claim 1, wherein the added acid is a mineral acid.

3. The process according to claim 1, wherein the temperature is between 140 and 185° C.

4. The process according to claim 1, wherein the consistency of the cellulose is from 8 to 50 on dry weight of the cellulose.

5. The process according to claim 1 wherein the hydrolysis time is from 5 to 180 minutes.

6. The process according to claim 1, wherein mechanical energy input during the hydrolysis is carried out to ensure even chemical and temperature distribution and without mechanical cutting and mechanical defibration of cellulose matrix.

7. The process according to claim 1, wherein the fibrous cellulosic material and the acid are mixed with each other.

8. The process according to claim 1 wherein the obtained microcellulose-hydrolysate mixture is neutralized or the microcellulose is separated from the hydrolysate, the separated microcellulose is optionally washed and the separated or washed microcellulose is neutralized, or the separated hydrolysate is neutralized.

9. The process according to claim 1, wherein the added acid is sulphuric acid, hydrochloric acid, nitric acid, sodium bisulphate or sodium bisulphite.

10. The process according to claim 1, wherein the temperature is between 150 and 180° C.

11. The process according to claim 1, wherein the temperature is between 155 and 175° C.

12. The process according to claim 1, wherein the consistency of the cellulose is from 15 to 50% on dry weight of the cellulose.

13. The process according to claim 1, wherein the consistency of the cellulose is from 20 to 50% on dry weight of the cellulose.

14. The process according to claim 1, wherein the consistency of the cellulose is from 25 to 45% on dry weight of the cellulose.

15. The process according to claim 1 wherein the hydrolysis time is from 15 to 150 minutes.

16. The process according to claim 1, wherein mechanical energy input during the hydrolysis is carried out to ensure even chemical and temperature distribution and mechanical cutting and mechanical defibration of cellulose matrix is between 1 and 5 kWh per dry ton cellulose.

17. The process according to claim 1, wherein the bleached pulp is kraft pulp, soda-AQ pulp, sulfite pulp, neutral sulfite pulp, acid sulfite pulp or organosolv pulp.

18. The process according to claim 1, wherein the produced microcellulose has an average particle size of 10-60 μm.

19. The process according to claim 1, wherein at least 90% by volume of produced microcellulose particles have a size of below 100 μm.

* * * * *